March 9, 1937.  A. W. GARDINER  2,073,146
CLUTCH
Filed April 4, 1934  2 Sheets-Sheet 2
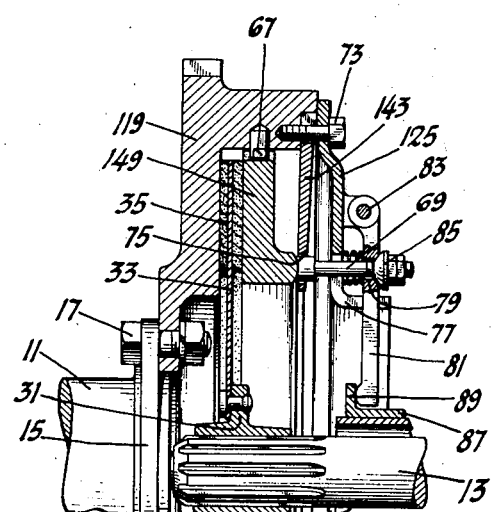
Fig. 4
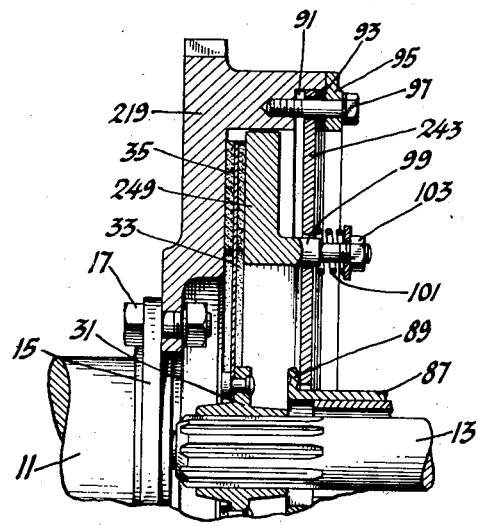
Fig. 5
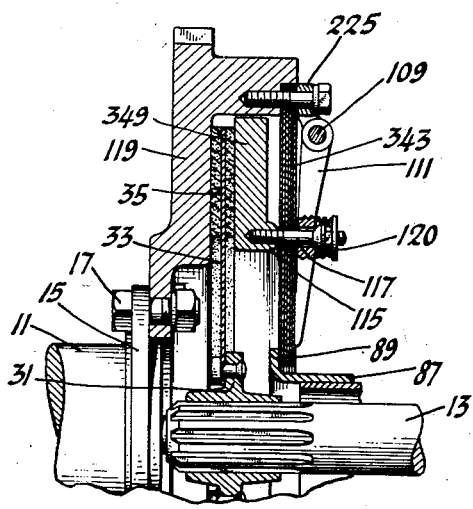
Fig. 6
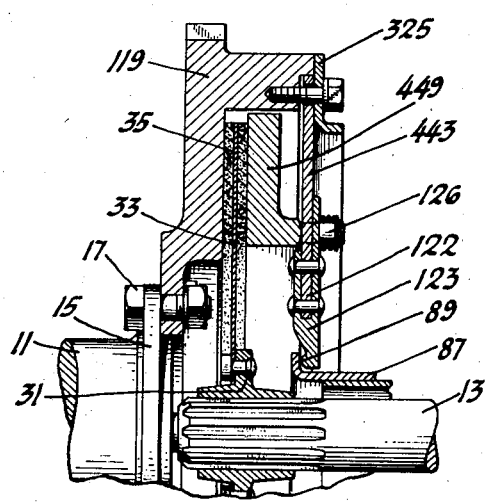
Fig. 7
Fig. 8
Inventor
Arthur W. Gardiner
By Blackmore, Spencer & Flint
Attorneys Patented Mar. 9, 1937

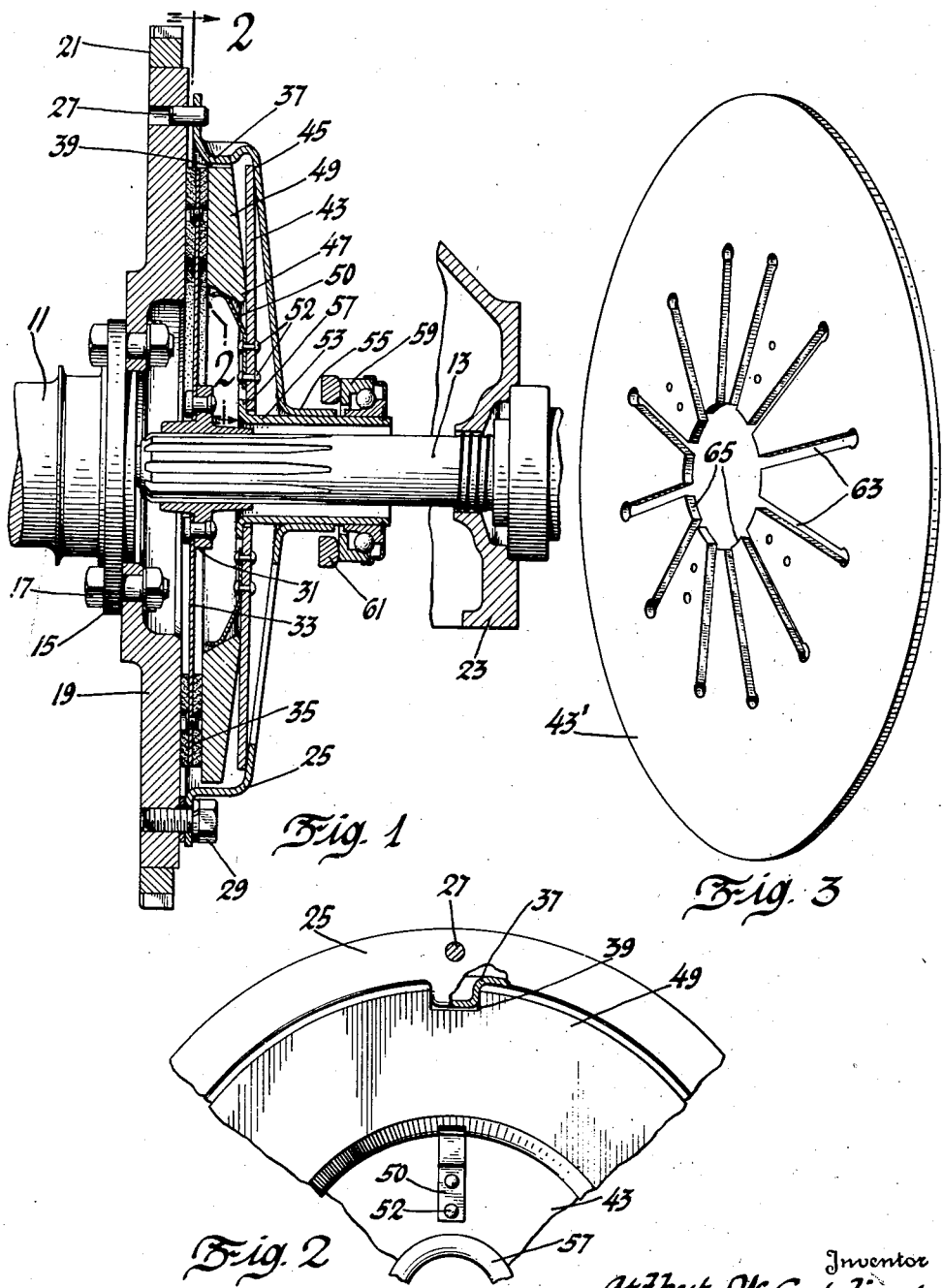

2,073,146

UNITED STATES PATENT OFFICE 2,073,146

CLUTCH

Arthur W. Gardiner, Detroit, Mich., assignor to General Motors Corporation, Detroit, Mich., a corporation of Delaware Application April 4, 1934, Serial No. 718,896

18 Claims. (Cl. 192—68)

This invention relates to clutches. It is intended primarily as an improvement in the disc clutch such as is used on motor vehicles between the engine shaft and the change speed input shaft. Although designed for this particular application, it will be understood that the expedient insofar as it relates to the deflection of the spring may be used in many other relations.

One object of the invention is the attainment of compactness of construction, which object is accomplished in the present construction by a reduction in the axial dimension of the clutch assembly.

Another object is a reduction in the cost of manufacture and the lessening of the labor and cost of servicing, due in part at least to a comparatively small number of parts.

Another object is an improvement in operation due to the presence of uniform pressure of the clutch spring upon the pressure plate and the avoidance of localized pressures tending to distort said pressure plate.

Among many other and perhaps equally important advantages should be included an improved centering means for mounting the pressure plate, a non-linear spring rate, and the possibility of using the yieldable clutch-engaging element to transmit the driving torque.

Other advantages, some inherent in certain forms and others in other forms of the invention will appear in the following description.

In the drawings accompanying this description:

Fig. 1 is a longitudinal section through a vehicle clutch embodying my invention.

Fig. 2 is a view in elevation as seen from line 2—2 of Fig. 1.

Fig. 3 is a perspective showing a modified form of clutch-operating spring.

Figs. 4, 5, 6 and 7 are views in longitudinal section showing other modified forms, each embodying the essential idea of the invention and each possessing certain characteristic advantages of its own.

Fig. 8 is a detail of Fig. 5.

Referring by reference characters to the drawings, numeral 11 is a driving shaft which in the embodiment illustrated may be assumed to be the shaft of an engine of a motor vehicle. At 13 is a driven shaft which may be understood to be the input shaft of the change speed mechanism of the vehicle. My novel clutch is shown as providing the releasable driving connection between the shafts 11 and 13. Shaft 11 has a flange 15 to which is secured by fastening means 11 a flywheel 19. The flywheel carries a ring gear 21 for engagement with the pinion of the starter motor as usual. The drawings show in fragmentary form the flywheel and clutch housing 23. A flywheel cover 25 is located in position by pins 27 and is secured to the flywheel by fastening means 29. The driven shaft 13 carries splined thereto the hub 31 of a driven clutch plate 33 to which are secured on opposite sides friction facings 35. The cover 25 has depressed regions 37 which are received in slots 39 cut radially into the periphery of a pressure plate 49. Movement of the pressure plate axially of the clutch grips the driven plate 33 between itself and the face of the flywheel, so that the rotary motion of the flywheel may be transmitted to the driven plate 33 and the shaft 13. As is usual in vehicle clutches, this axial movement of the pressure plate to clutch-engaging position is effected by yielding means. In the present invention the yielding means is designated by numeral 43. It is of annular form and in its unstressed condition may be described as a coned Belleville washer, its central region being out of the plane of its periphery. The outer periphery of this resilient member 43 engages the flywheel cover at 45. Between the outer and inner peripheries it is in circular contact as at 47 with the radially inner part of the pressure plate 49. Means, such for example as resilient clips 50 secured as at 52 to the yielding means 43, engage the pressure plate 49 in such a way that an axial movement of the inner circular part of the clutch spring member 43 away from the flywheel simultaneously moves the pressure plate in the same direction and releases the clutch.

A sleeve 53 slides axially in guided relation with a tubular rearward extension 55 of the cover 25. Sleeve 53 has a radial flange 57 engaging the inner edge of the yielding member 43. An anti-friction bearing 59 is retained on the other end of sleeve 53 and may be engaged by the ends 61 of a clutch throw-out lever whereby the sleeve 53 is moved to the right in the act of releasing the clutch.

Fig. 1 shows a clutch in its engaged position. In order to assemble the spring member relative to the other parts, its central region has been somewhat depressed from its normally bowed position of rest toward the plane of its outer region, so that the outer region is exerting pressure on the cover 25 (toward the right in Fig. 1), the inner edge is pressing the sleeve 53 to the left, and at the circular region of contact between the spring disc 43 and the pressure plate 49 there is sufficient pressure toward the left upon the pressure plate 49 to hold the driven disc 33 from slipping. Movement of sleeve 53 to the right relieves the pressure of the spring member on the pressure plate and a releasing movement of said plate may be assured by the use of parts 50.

A clutch constructed as above described has certain material advantages over the conventional designs, such for example as those wherein the pressure plate is applied by a circular series of coil springs and wherein the releasing lever operates through the instrumentality of a series of fingers to withdraw the pressure plate from engagement with the driven plate. This novel construction reduces materially the number of parts employed and thereby lessens the cost of manufacture and also the time and cost involved in service. It reduces the axial dimension of the assembly to an extent substantially represented by the difference between the length of the conventional coil springs and the height of the cone of the Belleville disc of this invention. The circular region of contact between the spring and the pressure plate avoids localized regions of pressure which may cause deflection of the pressure plate from parallelism with the flywheel face.

Another important advantage is found in the changes in pressure required to release the clutch. In the conventional clutch with coil springs progressive changes in load corresponds with progressive changes in deflection. As a result the applied pressure must be progressively greater for movements of the pressure plate from the clutch engaged position to the clutch release position. With a Belleville washer type of spring it is known that the curve representing the changes in load corresponding with changes in deflection is not a straight line as is the case with coil springs. With a Belleville spring the increase in pressure corresponding to the necessary flattening of the disc spring may be much less than in the case of coil spring clutches. This improves the operation of clutch release.

To reduce the load on the throw-out mechanism it is possible to modify the solid spring plate of Fig. 1 to the form shown by Fig. 3. In this figure the spring plate 43' is provided with radial saw cuts 63 extending from the central opening toward the periphery but not beyond the region of contact with the pressure plate. In effect this may be described as producing flexible integral levers 65 which give a softer action of clutch release requiring, however, more axial motion of 59. In other respects, this embodiment of the invention resembles that of Fig. 1.

In Fig. 4 is shown another embodiment of the inventive idea and one wherein certain other advantages may be obtained. In this form numerals 11, 13, 15, 17, 31, 33 and 35 represent the same parts as are indicated in Fig. 1. The flywheel is indicated by numeral 119 and a cover plate by numeral 125. Numeral 149 is the pressure plate mounted for axially slidable motion but in non-rotatable rotation to the flywheel by means of pins 67. Extending in an axial direction from the pressure plate are lugs 69 which may obviously be integral with or attached to the pressure plate. The resilient spring member corresponding to spring 43 of Fig. 1 is here shown to be of less radial extent and is marked 143. It is fastened to the flywheel by the cover securing means 73 but not necessarily firmly clamped. The spring member 143 is of tapering thickness from its outer periphery toward the center. It is notched as at 75 for the passage of the lugs 69, there being a shoulder adjacent the junction of each lug 69 and the pressure plate for engagement with the spring member 143. These lugs extend through notches 77 provided in the cover member. The lugs extend through apertures 79 in levers 81 pivoted at 83 to the cover. At the end of the lugs are nuts 85 having spherical faces engaging corresponding faces in the levers 81. The levers 81 extend inwardly toward the axis of the clutch and are adapted to be rocked in a counter-clockwise direction by the reciprocation of a sleeve 87, which sleeve has an annular flange 89 engaging the inner ends of the levers 81. It will be understood that in its unstrained condition the radially inner part of spring 143 is out of the plane of the outer periphery, being toward the left of that plane in the illustration. This inner part must be pressed toward the plane of the outer part, toward the right in the figure, to be assembled as shown and when so assembled is exercising pressure on the pressure plate to hold the clutch engaged. Movement of the sleeve 87 to the right through the levers 81 and the lugs 69 serves to move the pressure plate and release the clutch. In this form of the invention the presence of the levers provides a greater mechanical advantage in the act of flattening the Belleville spring. The tapered form of spring provides a better use of material and, for springs not initially coned, it is more easily possible to secure the lower spring rates desired.

In Fig. 5 is shown a further modification wherein the most important feature is the transmission of driving torque from the flywheel to the pressure plate and the driven shaft through the instrumentality of the clutch-engaging spring itself. In this embodiment the parts 11, 13, 15, 17, 31, 33, 35, 87 and 89 are substantially the same as the corresponding parts shown in Fig. 4. In this figure the flywheel 219 is shown with a recess deeper than that of Fig. 4 to receive the clutch spring. In this recess is located an engaging spring 243 which spring is more like that of Fig. 1 in that it extends radially inward to a region near the shaft 13 where it is directly engaged by a flange 89 on the sliding sleeve 87. For the purpose of adjusting the anchorage to change the spring characteristics, shims 93 are shown placed between the periphery of the clutch spring 243 and the flywheel cover, the cover in this instance being merely a ring 95 held by bolts 97. It will be seen that the pressure plate has been changed. It is no longer provided with sliding means peripherally engaging the flywheel to prevent relative rotation as is shown in Fig. 1 and Fig. 4. In this case the pressure plate 249 has axial extensions 99 extending through suitable openings in the spring 243 whereby the driving torque is transmitted through the spring 243 to the pressure plate. The release of the clutch is effected by a flattening of the spring plate which acts through the coil springs 101 and nuts 103 on the axial extension as shown by the figure. As to this form of the invention, it may be said that greater economy is secured by stamping the spring from flat stock without the expensive step of grinding required for the form of spring shown by Fig. 4. The torque drive through the disc spring avoids the sliding friction on the driving dogs between the flywheel and the pressure plate. The mounting of the pressure plate on the springs in this form as in the others constitutes a sort of self-aligning support whereby the pressure plate maintains parallelism with the cooperating flywheel clutch face. Minimum sliding action during engagement and disengagement is accomplished by the location of the torque anchorage between the spring and the pressure plate adjacent the point of application of the spring force.

In Fig. 6 parts 11, 13, 15, 17, 119, 31, 33, 35, 87 and 89 are like the corresponding parts in Fig. 4. The cover 125 of Fig. 4 is replaced by a ring 225 and a bolt secures the ring and a laminated spring 343 to the flywheel. The cover has pivots 109 for rigid arms 111 which lie against the outward face of the clutch spring. The pressure plate 349 has a rounded surface 115 engaging the spring again permitting self-centering of the pressure plate. Bolts 117 extend through both the spring 343 and the arm 111, and on the ends of the bolts are threaded nuts 120 engaging but not rigidly clamping the arms 111. The spring 343 in this case extends inwardly beyond the arm 111 and is engaged by the sliding sleeve 87 as before. In addition to the advantages present in the form shown by Fig. 5, this arrangement provides a simple expedient for securing the desired spring characteristics inasmuch as the thickness and number of spring leaves may be as desired. The "backing up" lever or arm is used to avoid excessive motion in the act of clutch releasing.

Fig. 7 illustrates a still further embodiment. In this figure parts 11, 13, 15, 17, 119, 31, 33, 35, 87 and 89 are like the parts similarly numbered shown in Fig. 4. The cover 325 is secured by bolts to the flywheel and holds in position a single plate Belleville spring disc 443. At the inner circular edge of the disc 122 are secured fingers 123 which engage the flange 89 of the sliding sleeve 87. At spaced positions circumferentially between the fingers 123 axial extensions 126 of the pressure plate 449 extend through openings in the spring whereby the resiliency of the spring is operable to move the pressure plate and whereby the driving torque from the flywheel to the spring is transmitted from the spring to the pressure plate. The rigid levers 123 serve the purpose of the rigid backing arms shown by Fig. 6.

I claim:

1. In a clutch, driving and driven members, yielding means to effect frictional engagement of said members, said driving member including an axially fixed member and an axially movable pressure plate, and said yielding means comprising a metallic annulus, an abutment member rigid with said axially fixed member, said annulus engaging said abutment member throughout a continuous circle of contact and also engaging said pressure plate throughout a continuous circle of contact, and means operably connected to the inner periphery of said annulus and movable to relieve the pressure exerted by said annulus on said pressure plate, said annulus comprising a plate tapering in thickness inwardly from its outer periphery.

2. In a clutch, driving and driven members, yielding means to effect frictional engagement of said members, said driving member including an axially fixed member and an axially movable pressure plate, and said yielding means comprising a metallic annulus, an abutment member rigid with said axially fixed member, said annulus engaging said abutment member throughout a continuous circle of contact and also engaging said pressure plate throughout a continuous circle of contact, and means operably connected to the inner periphery of said annulus and movable to relieve the pressure exerted by said annulus on said pressure plate, said annulus having fingers extending radially inward from the inner periphery thereof, and said pressure relieving means engaging said fingers.

3. In a clutch, driving and driven members, yielding means to effect frictional engagement of said members, said driving member including an axially fixed member and an axially movable pressure plate, and said yielding means comprising a metallic annulus, an abutment member rigid with said axially fixed member, said annulus engaging said abutment member throughout a continuous circle of contact and also engaging said pressure plate throughout a continuous circle of contact, and means operably connected to the inner periphery of said annulus and movable to relieve the pressure exerted by said annulus on said pressure plate together with a rigid arm pivoted to said fixed driving member and adapted to overlie the yielding means between the point of engagement between the yielding means and the pressure plate and the inner periphery of the yielding means.

4. In a clutch, driving and driven shafts, a flywheel carried by the driving shaft, a driven clutch disc carried by the driven shaft, a metallic resilient annulus being in the form of a bowed Belleville washer in its unstressed condition, said annulus being anchored at its external periphery to the flywheel, movable means engaging the inner periphery of said annulus to deflect the same, and a pressure plate movably engaging said annulus and moved by the resiliency thereof in self-aligning parallelism with said flywheel to engage the driven clutch disc between itself and said flywheel.

5. In a clutch, driving and driven shafts, a flywheel carried by the driving shaft, a driven clutch disc carried by the driven shaft, a metallic dished resilient Belleville washer type of annulus anchored at its external periphery to the flywheel, movable means engaging the inner periphery of said annulus to deflect the same, and a pressure plate movably engaging said annulus and moved by the resiliency thereof in self-aligning parallelism with said flywheel to engage the driven clutch disc between itself and said flywheel, the connection between the flywheel and annulus and the connection between the annulus and pressure plate constituting the means for transmission of driving torque.

6. In a clutch, first and second spaced driving discs, an intermediate driven disc, the second of the driving discs being an axially movable pressure plate, an annular spring member having the form of a Belleville washer when unstressed, said member being externally peripherally in circular contact with the first driving member to prevent axial movement of said peripheral portion, said pressure plate having circular contact with said spring member in self-centering relation at a position radially inward from the outer periphery of the spring member, and movable means engaging the inner periphery of the spring member to relieve the spring pressure on the pressure plate.

7. In a clutch, driving and driven members, a pressure plate to clamp said members together, and yielding means to move said pressure plate to clutch-engaging position, said yielding means comprising an annular resilient plate, means to hold the outer region of said plate in fixed position axially of said driving member, said resilient plate contacting said pressure plate in a region of lesser radial distance than said first-mentioned region, said resilient plate being circumferentially continuous between said regions of contact, and movably mounted means to axially move the inner region of said plate to release said clutch together with mechanism carried by said yielding means and engaging said pressure plate to move the latter from clutch-engaging position when the yielding means is released from clutch-engaging position.

8. In a clutch, driving and driven members, yielding means to effect frictional engagement of said members, said driving member including an axially fixed member and an axially movable pressure plate, said driven member adapted to be gripped therebetween, said yielding means comprising a metallic annulus, an abutment member rigid with said axially fixed member and spaced therefrom axially beyond said pressure plate, said annulus having a first continuous circular region in contact with said abutment member, and a second circular region of less radius than the first in contact with said pressure plate, and means operably connected to a radially inner part of said annulus and movable to tension the annulus to relieve the pressure between the driving and driven members, said annulus being circumferentially continuous between said regions of contact.

9. In a clutch, driving and driven members, yielding means to effect frictional engagement of said members, said driving member including an axially fixed member and an axially movable pressure plate, said driven member adapted to be gripped therebetween, said yielding means comprising a metallic annulus, an abutment member rigid with said axially fixed member and spaced therefrom axially beyond said pressure plate, said annulus having a first continuous circular region in contact with said abutment member, and a second circular region of less radius than the first in contact with said pressure plate, and means operably connected to a radially inner part of said annulus and movable to tension the annulus to relieve the pressure between the driving and driven members, said annulus being circumferentially continuous between said regions of contact together with lever means operably connected to said last-named means to provide a predetermined mechanical advantage.

10. The invention defined by claim 8, said annulus consisting of a plurality of laminae in nested relation.

11. In a clutch, driving and driven members, said driving member including an axially fixed member having an abutment rigid therewith and an axially movable pressure plate to grip said driven member between itself and said axially fixed member, a yieldable metallic annulus engaging said abutment in a substantially circular region of contact and similarly engaging said pressure plate at a different radial distance to cause the pressure plate to grip the driven plate between itself and the axially fixed member, the annulus being circumferentially continuous between said regions of contact, together with means to axially distort said annulus to release said driven plate.

12. In a clutch, driving and driven members, a pressure plate, a spring abutment rigid with said driving member, an annular spring plate having substantially circular regions of contact with the abutment and pressure plate whereby the driven member is clutched to the driving member, the part of the spring plate between said regions of contact being circumferentially continuous and means to relieve said driven member from the pressure of said spring plate.

13. In a clutch, driving and driven members, a pressure plate, a spring abutment rigid with said driving member, an annular spring plate having substantially circular regions of contact with the abutment and pressure plate whereby the driven member is clutched to the driving member, the part of the spring plate between said regions of contact being circumferentially continuous and means to relieve said driven member from the pressure of said spring plate, said spring plate being normally bowed to axially displace said regions of contact.

14. The invention defined by claim 12, said last-named means being operable upon the inner periphery of said annular plate to deflect it and relieve the pressure plate and driven plate from the pressure thereof.

15. In a clutch, driving and driven members, a pressure plate, a spring abutment rigid with said driving member, an annular spring plate having substantially circular regions of contact with the abutment and pressure plate whereby the driven member is clutched to the driving member, the part of the spring plate between said regions of contact being circumferentially continuous and means to relieve said driven member from the pressure of said spring plate, said annular spring plate having a plurality of spring fingers extending inwardly and radially from a base circle radially within the region of contact with the pressure plate, said last-named means engaging said fingers.

16. In a clutch, spaced first and second driving members, the second of which is movable axially toward the first, a driven member adapted to be gripped between said driving members, an annular axially yieldable plate, said plate engaging each of said driving members with a substantially circular region of contact, said regions being of unequal radii, the part of the plate between said regions being circumferentially continuous, said yieldable plate being normally stressed in assembly to hold said driven member in gripped relation, and other means to stress said yielding plate additionally thereby to relieve the pressure transmitted from the yielding plate through the second driving member to the driven member.

17. The invention defined by claim 16, said yielding plate being bowed in its unstressed condition.

18. In a clutch, driving and driven members, a pressure plate, a spring abutment rigid with said driving member, an annular spring plate having substantially circular regions of contact with the abutment and pressure plate whereby the driven member is clutched to the driving member, the part of the spring plate between said regions of contact being circumferentially continuous and means to relieve said driven member from the pressure of said spring plate, said spring plate being normally bowed when unstressed.

ARTHUR W. GARDINER.